(12) United States Patent
Eve et al.

(10) Patent No.: US 11,314,957 B1
(45) Date of Patent: Apr. 26, 2022

(54) CAN CONTENT VERIFICATION SYSTEMS AND METHODS

(71) Applicant: Canpack S.A., Cracow (PL)

(72) Inventors: René Eve, Tampere (FI); Jari Visa, Haukila (FI)

(73) Assignee: CANPACK S.A., Cracow (PL)

( * ) Notice: Subject to any disclaimer, the term of this patent is extended or adjusted under 35 U.S.C. 154(b) by 0 days.

(21) Appl. No.: 17/401,707

(22) Filed: Aug. 13, 2021

(51) Int. Cl.
*G06K 7/14* (2006.01)

(52) U.S. Cl.
CPC ................. *G06K 7/1413* (2013.01)

(58) Field of Classification Search
CPC ...... G06K 7/14; G06K 7/1413; G06K 7/1417; G06K 7/1434; G06K 7/10722; G06K 7/10861; G06K 19/06037
USPC ............. 235/462.01, 375, 487, 454
See application file for complete search history.

(56) References Cited

U.S. PATENT DOCUMENTS

| | | | | |
|---|---|---|---|---|
| 7,433,590 | B2 * | 10/2008 | Freyman | G03B 15/03 396/157 |
| 2007/0146491 | A1 * | 6/2007 | Tremblay | G06T 7/0004 348/211.99 |
| 2008/0011702 | A1 * | 1/2008 | Walsh | B65D 1/0207 215/44 |
| 2015/0136845 | A1 * | 5/2015 | de Araujo Silva | G06Q 30/0185 235/375 |
| 2016/0153917 | A1 * | 6/2016 | Couturier | G01N 21/8986 356/445 |
| 2018/0022557 | A1 * | 1/2018 | Tanaka | B65G 61/00 53/500 |
| 2018/0205892 | A1 * | 7/2018 | Kamimura | G06Q 10/08 |
| 2020/0356798 | A1 * | 11/2020 | Kotula | G06K 9/6201 |

FOREIGN PATENT DOCUMENTS

CA      2888153 A1 *  4/2014  ............... G06K 9/00

* cited by examiner

*Primary Examiner* — Edwyn Labaze
(74) *Attorney, Agent, or Firm* — Kilpatrick Townsend & Stockton LLP (57) ABSTRACT

A method of verifying an identity of objects in a production line may include transporting a plurality of objects along a production line. The method may include detecting an individual object of the plurality of objects using a proximity sensor. The method may include triggering a plurality of imaging sensors to capture an image of a barcode on an outer surface of the individual object based on detection of the individual object by the proximity sensor. The method may include determining whether data from the barcode matches predetermined barcode data.

31 Claims, 7 Drawing Sheets

CAN CONTENT VERIFICATION SYSTEMS AND METHODS

FIELD OF THE INVENTION

The present technology relates to components and apparatuses for manufacturing beverage cans. More specifically, the present technology relates to image-based techniques for ensuring that each can produced meets quality control standards.

BACKGROUND OF THE INVENTION

During the filling of beverages it is imperative that a correct beverage is dispensed into a correct can, bottle, or other packaging material. Matching up a correct beverage with a correct product package may be particularly important in preventing an alcoholic beverage from being dispensed into a soda can, for example. Currently, production lines utilize mixed label inspection techniques to verify that a correct can is being filled. In mixed label inspection, an imaging system is trained to learn what the correct label or other decoration of a given product looks like. The imaging system then compares the outside of each can to the image of the correct label to determine whether a correct can is present. However, there are several problems with conventional mixed label inspection techniques. For example, the imaging systems typically only have a 60-80% accuracy rate. This relatively low accuracy rate, coupled with the speed of the line (oftentimes exceeding 200, 500, or 1000 cans per minute in a given line of cans), may lead to an unacceptably high error rate. Additionally, brands often utilize similar packaging, with only slight differences, for similar products within a given product line. For example, a diet version of a drink may have a slightly different color scheme and one or two minor design changes when compared to a design for a corresponding non-diet formulation. These slight differences may make it difficult for imaging systems to accurately identify a given can. Additionally, there is a chance that a wrong can is used in the training run, which may lead the imaging system to identify cans incorrectly. Therefore, improvements in verifying the correct identity of cans and other packaging are needed.

BRIEF SUMMARY OF THE INVENTION

Some embodiments of the present technology may encompass methods of verifying an identity of objects in a production line. The methods may include transporting a plurality of objects along a production line. The methods may include detecting an individual object of the plurality of objects using a proximity sensor. The methods may include triggering a plurality of imaging sensors to capture an image of a barcode on an outer surface of the individual object based on detection of the individual object by the proximity sensor. The methods may include determining whether data from the barcode matches predetermined barcode data.

In some embodiments, the methods may include halting movement of at least a portion of the production line upon determining that the data from the barcode does not match the predetermined barcode data. The methods may include removing the individual object from the production line upon determining that the data from the barcode does not match the predetermined barcode data. The barcode may be aligned vertically along a side of the individual object. The methods may include comparing a number of objects detected by the proximity sensor with a number of barcodes analyzed by the plurality of imaging sensors to determine whether all of the plurality of objects within a production run have been verified. The methods may include removing the individual object from the production line if no barcode is imaged by the plurality of imaging sensors. The methods may include illuminating the outer surface of the object with a plurality of light sources that are directed toward the outer surface.

Some embodiments of the present technology may encompass production lines. The production lines may include a conveyor mechanism that is configured to transport a plurality of objects down a portion of the production line. The production lines may include a proximity sensor disposed along the conveyor mechanism. The production lines may include a plurality of imaging sensors directed at the conveyor mechanism. The production lines may include one or more processors. The production lines may include a memory. The memory may have instructions stored thereon that, when executed, cause the one or more processors to detect an individual object of the plurality of objects using the proximity sensor. The instructions may further cause the one or more processors to trigger the plurality of imaging sensors to capture an image of a barcode on an outer surface of the individual object based on detection of the individual object by the proximity sensor. The instructions may further cause the one or more processors to determine whether data from the barcode matches predetermined barcode data.

In some embodiments, the production lines may include a removal mechanism positioned downstream of the plurality of imaging sensors. The instructions may further cause the one or more processors to cause the removal mechanism to remove the individual object from the production line upon determining that the data from the barcode does not match the predetermined barcode data. The removal mechanism may include a pneumatic blower that is configured to emit pressurized air to remove objects from the production line. The production lines may include a plurality of light sources that emit light that is directed toward imaging fields of the plurality of imaging sensors. Each of the plurality of light sources may be positioned above or below a height of the individual object. The plurality of imaging sensors may be arranged to generate an overall image field that extends 360 degrees about the individual object. The plurality of imaging sensors may include four imaging sensors, with one of the four imaging sensors disposed within a different quadrant about the individual object.

Some embodiments of the present technology may encompass production lines. The production lines may include a conveyor mechanism that is configured to transport a plurality of objects down a portion of the production line. The production lines may include a proximity sensor disposed along the conveyor mechanism. The production lines may include a plurality of optical sensors directed at the conveyor mechanism. The production lines may include one or more processors. The production lines may include a memory. The memory may have instructions stored thereon that, when executed, cause the one or more processors to detect an individual object of the plurality of objects using the proximity sensor. The instructions may further cause the one or more processors to analyze a barcode detected on an outer surface of the individual object using the plurality of optical sensors based on detection of the individual object by the proximity sensor. The instructions may further cause the one or more processors to determine whether data from the barcode matches predetermined barcode data.

In some embodiments, each of the plurality of optical sensors may include a camera that is configured to image the outer surface of the individual object. Analyzing the barcode may include detecting the barcode within an image of the outer surface of the individual object. Each of the plurality of optical sensors may include a laser scanner. The production lines may include a plurality of light sources directed toward image fields of the plurality of optical sensors. A number of the plurality of light sources may be equal to or greater than a number of the plurality of optical sensors. The instructions may further cause the one or more processors to halt movement of at least a portion of the production line upon determining that the data from the barcode does not match the predetermined barcode data. The instructions may further cause the one or more processors to compare a number of objects detected by the proximity sensor with a number of barcodes analyzed by the plurality of imaging sensors to determine whether all of the plurality of objects within a production run have been verified. The production line may include a necker that is configured to shape a neck of each of the plurality of objects. The conveyor mechanism may be configured to transport the plurality of objects from the necker at least partially to a subsequent station of the production line. The subsequent station may include a palletizer. The production line may include an unloading mechanism that is configured to transfer the plurality of objects from a pallet to the conveyor mechanism. The production line may include a filling station that is configured to receive acceptable objects of the plurality of objects from the conveyor mechanism.

Some embodiments of the present technology may encompass production lines in beverage package filling facilities. The production lines may include a conveyor mechanism that is configured to transport a plurality of cans or bottles down a portion of the production line. The conveyor mechanism may transport the cans or bottles from an unloading mechanism, such as a de-palletizer, to a beverage filling station. The production lines may include a proximity sensor disposed along the conveyor mechanism. The production lines may include a plurality of optical sensors directed at the conveyor mechanism. The production lines may include one or more processors. The production lines may include a memory. The memory may have instructions stored thereon that, when executed, cause the one or more processors to detect an individual object of the plurality of objects using the proximity sensor. The instructions may further cause the one or more processors to analyze a barcode detected on an outer surface of the individual object using the plurality of optical sensors based on detection of the individual object by the proximity sensor. The instructions may further cause the one or more processors to determine whether data from the barcode matches predetermined barcode data.

Some embodiments of the present technology may encompass methods of verifying an identity of objects at a beverage package filling stations and/or facilities. The methods may include transporting a plurality of objects along a production line. The cans or bottles may be transported from an unloading mechanism, such as a de-palletizer, to a beverage filling station. The methods may include detecting an individual object of the plurality of objects using a proximity sensor. The methods may include triggering a plurality of imaging sensors to capture an image of a barcode on an outer surface of the individual object based on detection of the individual object by the proximity sensor. The methods may include determining whether data from the barcode matches predetermined barcode data. When the data from the barcode matches the predetermined barcode data, the can may be approved and transported further down the production line, such as to a filling station.

BRIEF DESCRIPTION OF THE DRAWINGS

A further understanding of the nature and advantages of the disclosed technology may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION OF THE INVENTION

The ensuing description provides exemplary embodiments only, and is not intended to limit the scope, applicability, or configuration of the disclosure. Rather, the description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments of the present invention are directed to systems and methods for verifying that a correct product container, e.g., beverage can, is being prepared for a given product. For example, the systems and methods described herein may be used to ensure that a correct can is being palletized and/or otherwise packaged, or is being filled with a particular beverage. Embodiments may verify the identity of a given can using one or more imaging and/or optical sensors that are arranged to monitor an outside of each can as the can proceeds down a production line. The sensors may analyze information encoded on the can (such as in a barcode, QR code, or RFID tag) and compare the information read from the can with predetermined barcode data to determine if the can is the correct type of can to be on the production line. Incorrect cans (referred to herein as "foreign cans") may be removed from the production line. In some embodiments, when a foreign can is detected, the production line may be automatically halted such that a human may inspect the production line and determine how the foreign can entered the production line. As used herein, "automatically" means without any human intervention.

While described primarily in the context of beverage cans, it will be appreciated that the systems and methods described herein may be utilized in other manufacturing processes in which the identify of a product or other object needs to be verified and/or a high rate of accuracy is necessary. Additionally, while described primarily in the context of verifying the identity of cans prior to palletizing and/or filling operations to prevent the wrong can from being filled with a particular beverage, it will be appreciated that the techniques described herein may be implemented at other locations within a production line. Additionally, the techniques described herein are not limited to beverage cans and may be utilized in other applications, such as other canning operations, bottling operations, and/or other operations in which a specific package is filled with a particular object and/or substance.

Figure 1:
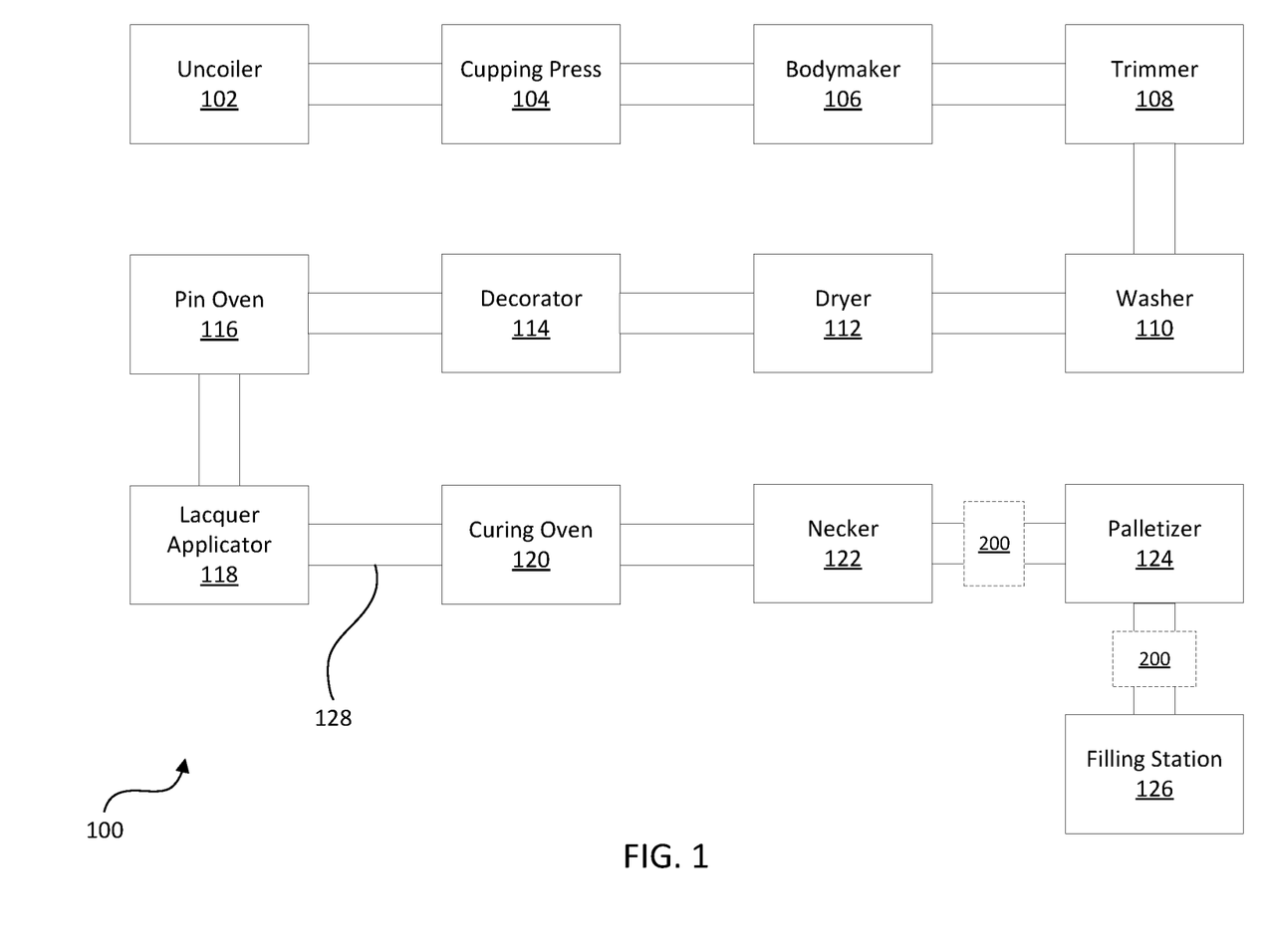
FIG. 1 illustrates a schematic view of a production line 100 for producing beverage cans according to embodiments of the present invention.

FIG. 1 illustrates a schematic view of a production line 100 for producing beverage cans, such as aluminum cans. Production line 100 will be described as including a number of different devices and is merely representative of one example of a production line. It will be appreciated that numerous variations may exist and that functionality described in relation to one or more devices may be combined and performed by a single device in some embodiments, while in other embodiments functionality attributed to a single device may be performed by a number of distinct devices. Additionally, some embodiments may include additional steps and/or omit one or more steps. Production line 100 may include an uncoiler 102 that lubricates sheet metal and feeds the lubricated sheet metal into a cupping press 104. The cupping press 104 may include a punch that punches out disc-shaped blanks from the sheet metal and subsequently forms the blanks into cup-shapes. For example, the flat disc-shaped blanks may be positioned between a drawing die and a blank holder. The drawing die may define a receptacle that is sized to be larger than a final diameter of the finished can. A punch may press a portion of the blank into the receptacle such that the blank is transformed into a cup-shape.

The cup-shaped blank may be transported to a bodymaker 106, which may form a general shape of the can. For example, the bodymaker 106 may position each cup-shaped blank over a re-drawing die, which may have a diameter that approximately matches a diameter of the finished can. A punch may press the cup-shaped blank through the re-drawing die, which increases the height of the blank while reducing a diameter of the blank to be approximately equal to that of the finished can. After re-drawing the blank, a number of ironing stages may be performed on each blank. For example, in some embodiments each can blank may be passed through three or more ironing stages. At each ironing stage, the blank may be positioned over an ironing die that defines a central aperture, with each successive ironing stage having an ironing die that has an inner diameter that is slightly smaller than the outer diameter of the can blank. At each stage, a punch may press the can blank through the ironing die, which causes the can blank to be stretched vertically, while keeping an inner diameter of the blank unchanged. The ironing process may be repeated any number of times until the can blank has a height that is greater than a final height of the finished can. Oftentimes, during the drawing, re-drawing, and/or ironing process, the bodymaker 106 may spray or otherwise supply a lubricating fluid to the can blank to lubricate and cool the can blank during formation of the can body. After ironing, the blank may be domed. For example, the can blank may be positioned over a doming tool that has a convex dome-shaped surface. A punch having a concave lower surface may press a bottom surface of the blank against the doming tool to form a dome-shaped indentation on the bottom of the blank. After the dome-shaped indention is formed, the blank may be transported to a trimmer 108. The trimmer 108 may trim and/or otherwise remove a top end of the blank such that the top end of the blank has a straight top edge and such that the can blank has a desired height.

After trimming, the blanks may be transported to a washer 110. A number of washing and/or etching operations may be performed on each blank to wash away lubricants from the bodymaker 106 and/or to prepare the surface of the can blank for printing. For example, in some embodiments, a six-stage cleaning process may be performed. In some embodiments, each can blank may be sprayed with two stages of an acid wash. For example, the acidic wash may include sulfuric acid (such as 30% to 40% molar $H_2SO_4$) and/or other acid-based cleaning agents, which may etch and/or otherwise remove a thin layer of material from the surface of the can blank. Additional cleaning solutions may include, without limitation, Ridoline 740E, Ridoline 120SNF, Bonderite 404S, and/or Bonderite 77 produced by Henkel of Dusseldorf, Germany.

A number of water washes may be performed on each can blank after the acid wash stages. For example, deionized water may be sprayed and/or otherwise applied to the can blank to rinse away the other cleaning solutions. After washing, the can blanks may be transported to a dryer 112. The dryer 112 may include an oven, air jet, and/or other drying mechanism that may dry the can blanks prior to applying any decoration to the can blank.

The dried can blanks may be transported to a decorator 114, which may apply a decoration (such as a brand name, product name, nutrition information, etc.) to an outer surface of the can blank. The decorator 114 may apply any decoration to the outer surface of the can blank in one or more steps. For example, the decorator 114 may be an 8-color offset machine (or other number of colors) that may apply ink to the outer surface of the can blank using a rotation printing process to generate a desired decoration. After printing the decoration, the decorator 114 may apply an overprint varnish to protect the ink. A bottom of the can may be rim-coated, which may help facilitate rotation and/or other movement of the can blank along the production line. The decorated can blanks may be cured within a pin oven 116 to harden the ink and varnish.

The cured can blanks may be transported to a lacquer applicator 118. The lacquer applicator 118 may apply a food-grade lacquer to an interior surface of each can blank. This lacquer may help ensure that the final beverage and metal do not contact and/or react with one another. For example, the lacquer may prevent a beverage from eating through the metal, and may also prevent materials from the metal from leeching into and/or reacting with the beverage. The lacquer may be dried within a curing oven 120.

The can blanks may then be transported to a necker 122. The necker 122 may shape a top end of the can blank to form a neck. For example, a number of necking stages may gradually narrow the top end of the can blank to form the neck. Each necking stage may include an inner die that is inserted within the can blank and a necking die that is positioned outside the can blank. In each stage, the necking die has a slightly smaller inner diameter so as to slightly bend the top of the can inward to form the neck. In some instances, as many as 11 necking stages may be used to form the neck. Once the neck is formed, a top edge of the neck may be curved over to form a flange that may later be used in sealing the can. After the neck has been flanged, the cans may be transported to a palletizer 124, which may arrange the cans on pallets for transport to a filling facility and/or station 126.

The filling station 126 may be in a same facility as the rest of the production line 100 and/or may be located in a remote facility. For example, a manufacturer of the cans may provide the palletized cans to a bottler, which may fill and seal the cans for shipment to customers. At the filling station 126, each can may be filled with a beverage (or other substance) that corresponds to the decoration and/or other identifier (such as a barcode) that is printed on the can. After the cans are filled, a top, such as a lid having a stay-on tab, may be affixed to the flanged neck of the can. For example, edges of the lid and flanged neck may be crimped together, oftentimes with a sealant disposed therebetween to help seal the can. Prior to and/or during filling, the liquid may be pasteurized to kill bacteria within the can. This process may involve heating the liquid up to a temperature of at least 63° C. in some embodiments. In some embodiments, the pasteurization may include heating the liquid prior to dispensing the liquid into the cans. In other embodiments, once filled, the cans may be heated within a pasteurization oven to heat the liquid inside the cans to the necessary temperature. For example, heated water (such as water at 65° C.-80° C.) may be sprayed on the filled cans to heat the contents of the can. After the cans have reached the necessary temperature, the cans may be cooled prior to palletization, such as by spraying the cans with cool water. This cooling may help prevent the formation of condensation on the outside of the cans, which may damage cardboard used in the palletization/packing process.

Transportation of the cans/blanks between the various devices may be performed by different conveyor mechanisms 128 throughout the manufacturing process. The mechanism chosen for a given stage may depend on a number of lines of cans entering and/or exiting a given device, a desired throughput, a desired orientation of the cans entering and/or exiting a given device, a current state of the cans entering and/or exiting a given device, and/or other factors. Possible conveyor mechanisms may include conveyor belts, vacuum conveyors (such as vacuum bridges), chain conveyors, roller conveyors, chute conveyors, vertical conveyors, wheel conveyors, pneumatic conveyors, and/or other conveyor mechanisms.

The production line 100 may include any number of quality control stations (not shown) positioned at one or more locations along the production line 100. The quality control stations may check for defects within the cans and ensure that each can meets a required quality control standard. The quality control stations may include one or more sensors (such as imaging sensors, scales, coating thickness gauges, enamel raters, tension meters, and the like) that may be used to determine whether individual cans meet the quality control standards. For example, the sensors may detect a wall thickness of the cans, a dome depth, can weight, proper diameters of the cans, a can height, presence of varnish and/or lacquer, quality of decoration (possibly including a barcode and/or other identifier), presence of a bottom rim coating, packaging quality, and the like. The quality control stations may be positioned after a given operation (e.g., checking a thickness of varnish and/or lacquer immediately after application/curing) and/or may be positioned at a later stage of the production line 100. For example, in some embodiments one or more quality control stations may be positioned just prior to the palletizer 124, such that the sensors may detect any defects that have occurred during production prior to the cans being loaded onto a pallet for shipment to a customer and/or filling. Similarly, one or more quality control stations may be positioned along the filling station 126 to ensure that the cans meet quality control standards prior to, during, and/or after filling of the can.

Production line 100 may include one or more removal mechanisms (not shown) that may be positioned at one or more points along the production line 100. The removal mechanisms may be used to remove defective and/or otherwise imperfect cans from the production line 100. For example, if one of the quality control stations determines that a given can or group of cans does not meet a predetermined quality control standard, a removal mechanism may remove the can or group of cans from the production line 100. In some instances, only those cans that have been determined to not meet quality control standard may be removed, while in other embodiments a section of cans proximate the defective can or cans may also be removed. The removal of cans proximate a defective can may be particularly useful in some instances. For example, cans that are improperly oriented on a piece of equipment may lead to collateral damage to nearby otherwise good cans. The removal mechanisms may take many forms, such as air guns, vacuum bridges, mechanical arms, magnetic rejection system (for packaging materials that are ferromagnetic), and/or other known removal mechanisms.

Figure 2:
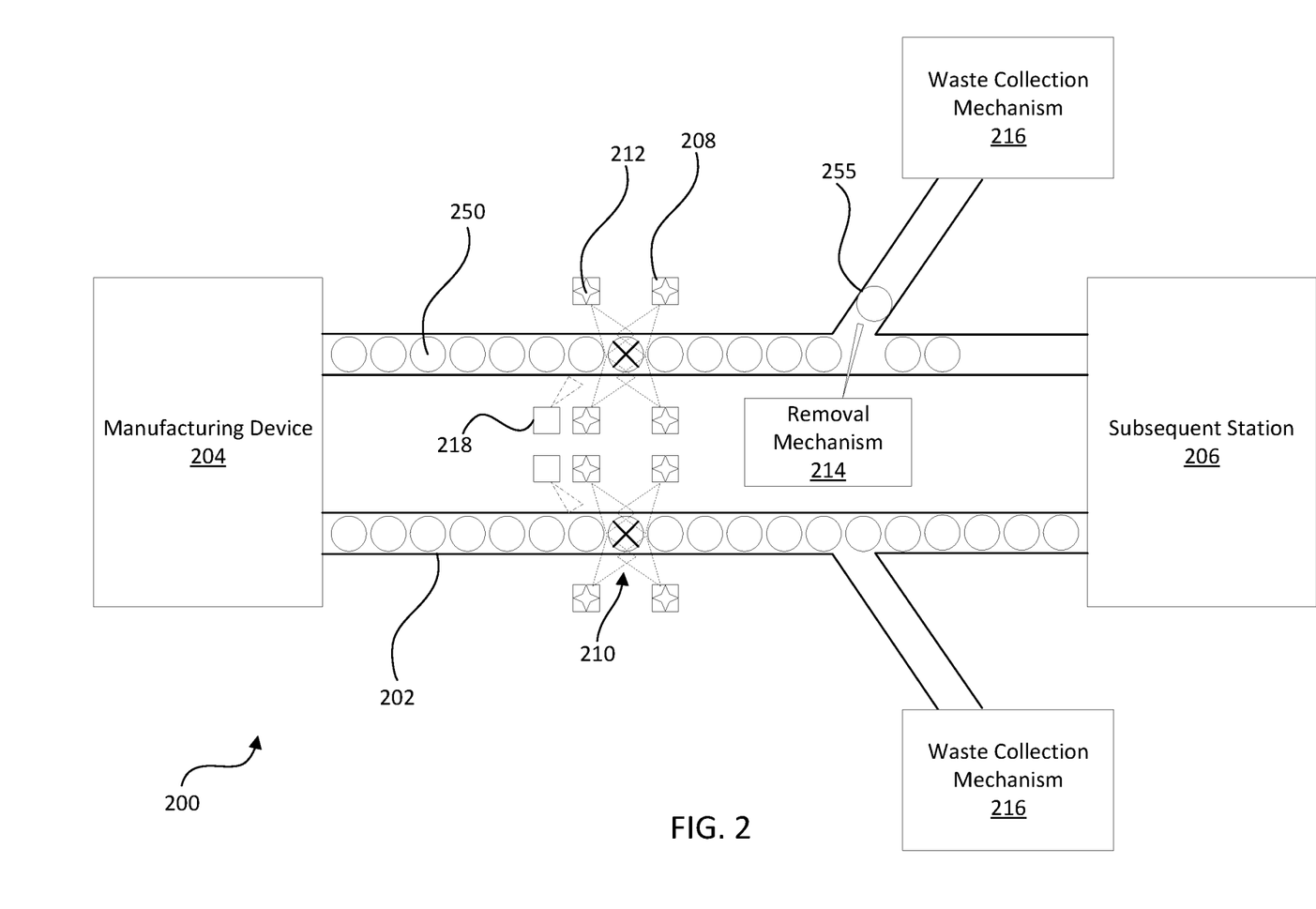
FIG. 2 illustrates a schematic partial top plan view of a production line according to embodiments of the present invention.

FIG. 2 illustrates a schematic partial top plan view of an exemplary production line 200 according to some embodiments of the present technology. FIG. 2 may illustrate further details relating to components in production line 100, such as for a quality control station. Production line 200 is understood to include any feature or aspect of production line 100 discussed previously in some embodiments. The production line 200 may be used to manufacture and/or fill cans 250 as previously described, as well as other products and objects. Each can 250 (or other object) may include a barcode or other identifier that is encoded with data. Barcodes may include any kind of one-dimensional barcodes (e.g., linear barcodes) and/or two-dimensional barcodes (e.g., quick response (QR) codes, data matrix codes, etc.). Oftentimes, when one-dimensional barcodes are used, the barcodes may be provided in a horizontal and/or vertical orientation along an outer surface of the can. As will be explained in greater detail elsewhere, this orientation applying the barcodes in a vertical orientation may enable data from the barcode to be decoded and analyzed even if only a portion of the barcode is visible. Production line 200 may show a partial view of the production line components being discussed and that may be incorporated in a larger manufacturing system. Any aspect of production line 200 may also be incorporated with other production lines or manufacturing systems as will be readily understood by the skilled artisan.

Production line 200 may include one or more conveyor mechanisms 202 that may transport a number of objects, such as beverage cans 250, down a portion of the production line 200. Each conveyor mechanism 202 may be positioned proximate an output of a manufacturing device 204 and may transport cans 250 from the manufacturing device 204 downstream to a subsequent station 206 of the production line 200. As just one example, the conveyor mechanism 202 may be positioned after the necker 122 (the manufacturing device 204) of production line 100 and may transport the formed cans 250 at least partway to the palletizer 124 (the subsequent station 206) as described above in relation to FIG. 1. In other embodiments, the conveyor mechanism 202 may be part of a filling station 126 and be positioned after an unloading mechanism, such as a de-palletizer, (the manufacturing device 204) that unloads cans 250 from a pallet or other storage unit for transport to a filling nozzle of the filling station 126 (the subsequent station 206). It will be appreciated that in various embodiments the conveyor mechanism 202 may be positioned at any location on a production line downstream of the decorator 114 (which applies the barcode to the can 250). In beverage filling facilities, the conveyor mechanism 202 may be positioned at any location between the unpacking mechanism and a packing machine, such as just before and/or after the filling station 126. The conveyor mechanism 202 may be any type of conveyor mechanism, such as but not limited to, a belt conveyor, a vacuum conveyor, or chain conveyor. In some embodiments, one or more conveyor mechanisms 202 may transport the cans 250 in one or more single file lines along at least a portion of a length of the conveyor mechanism 202. In the case of cans 250, the cans 250 may be positioned on the conveyor mechanism 202 with the domed-bottom end facing down in some embodiments.

Production line 200 may include a number (four are shown for each conveyor mechanism 202) of imaging sensors 208 (which may include optical sensors such as laser barcode readers), which may each be directed at an imaging position 210 on the conveyor mechanism 202. For example, each of the imaging sensors 208 may be positioned alongside of one of the single file lines of the conveyor mechanism 202 at a height that is proximate a height of the cans 250, although the imaging sensors 208 may be positioned above or below the height of the cans 250 in some embodiments. One or more imaging sensors 208 may be positioned on either side of each single file line such that both sides of each can 250 may be imaged. In embodiments in which multiple single file lines are included, each line may include one or more dedicated sets of imaging sensors 208. The use of multiple sets of imaging sensors 208 on a given single file line may enable multiple cans 250 to be imaged simultaneously. For example, two sets of imaging sensors 208 may be positioned such that each set images every other can 250 transported down the production line 200. In some embodiments, each imaging sensor 208 may be positioned at approximately a height of a barcode printed on each can 250, although the imaging sensors 208 may be positioned at other heights in various embodiments. By positioning the imaging sensors 208 in such a manner, it may be easier to read barcodes detected within images of cans 250 captured by the imaging sensors 208.

In some embodiments, the imaging sensors 208 may be cameras, such as digital cameras that include charge-coupled device (CCD) and/or complementary metal-oxide-semiconductor (CMOS) sensors and/or may include other types of imaging sensors that can detect the presence of, and read data encoded on a barcode. In a particular embodiment, the imaging sensors 208 may include polarized retro-reflective photoelectric sensors. In some embodiments, optical sensors, such as laser barcode scanners may be used and may directly scan and decode data from barcodes on each can 250. The imaging sensors 208 may capture still images and/or video images in various embodiments. For example, in some embodiments, the imaging sensors 208 may be triggered to capture an image (or scan a barcode) each time a can 250 is detected as being in or approaching the imaging position. In other embodiments, an image may be taken at regular intervals, such as at intervals that match a rate that the cans 250 pass the imaging position and/or a video image may be continuously captured during a given production run. In such embodiments, the imaging sensors 208 may be triggered with or without the use of proximity sensors (as will be described elsewhere herein). Imaging sensors 208 may capture images of each can 250 passing through the single file line.

Figure 3:
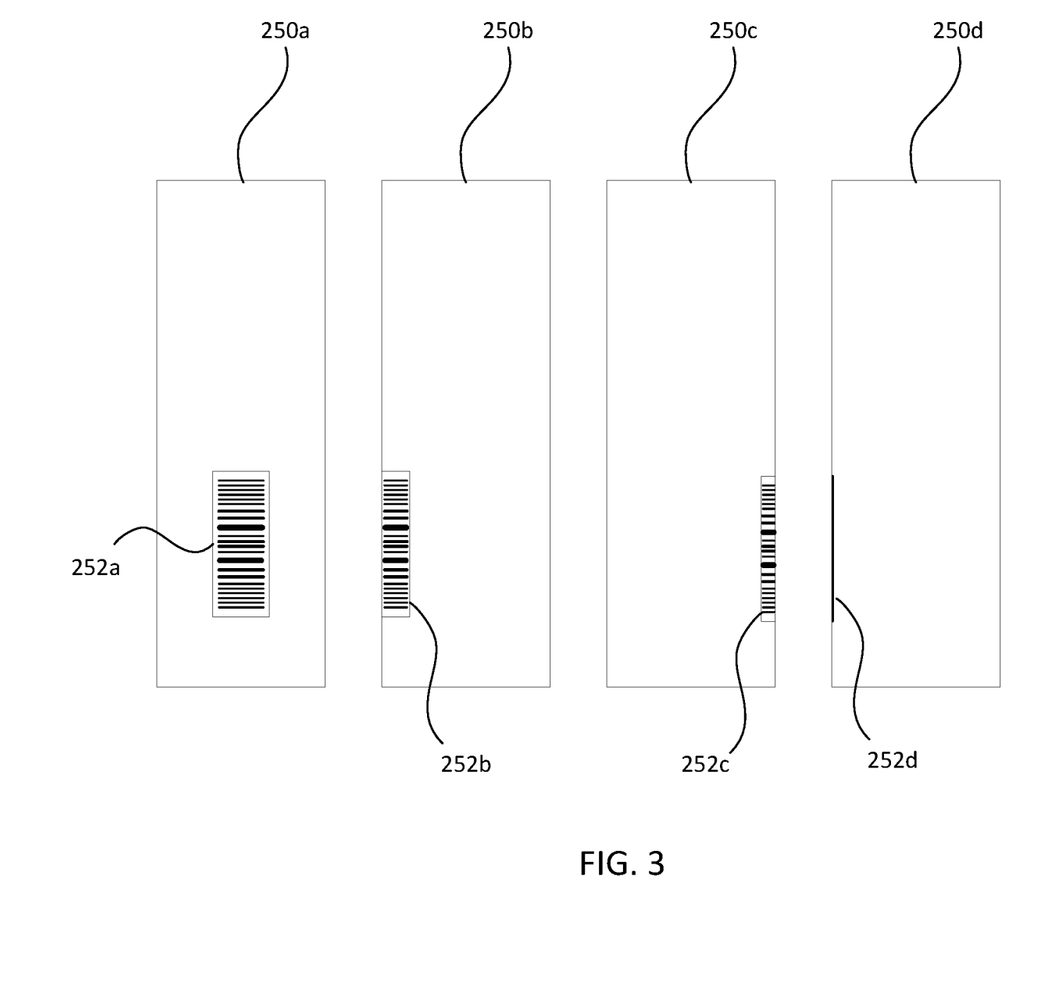
FIG. 3 illustrates a number of cans in a single file line according to embodiments of the present invention.

Oftentimes, due to the manner in which cans 250 are loaded onto and/or transported by the conveyor mechanism 202, the cans 250 may be positioned at different orientations when the cans 250 reach the imaging position 210. Additionally, as the cans 250 may be moved from a number of lanes to into single file lines, rotation may be imparted on some or all of the cans 250 as the cans 250 pass down a length of the conveyor mechanism 202. The cans 250 are typically spaced closely together, with only a small gap (e.g., less than 1 can width, less than 0.5 of a can width, or less than 0.25 of a can width) separating adjacent cans 250. To help maintain a consistent spacing between the cans 250, one or more mechanisms, such as silicone and/or rubber brake guards and/or industrial brushes may be used. In other embodiments, the spacing between cans 250 may be maintained by adjusting airflow of an air-infeed that may transport the cans 250 down the conveyor mechanism 202. FIG. 3 illustrates a single file line of cans 250 that may be imaged by imaging sensors 208. For example, can 250*a* may have a fully visible barcode 252*a*, which may be captured by one or more imaging sensors 208. Can 250*b* may have a partially visible barcode 252*b*, with a portion of the barcode 252*b* being obscured by can 250*a*. Can 250*c* may have a partially visible barcode 252*c*, with a portion of the barcode 252*c* being obscured by can 250*d*. Can 250*d* may have a fully obscured barcode 252*d*, as the barcode 252*d* may be directly (within about 10 degrees or less) facing can 250*c*, which may fully block the barcode 252*d* from the imaging field of any of the imaging sensors 208.

Figure 2A:
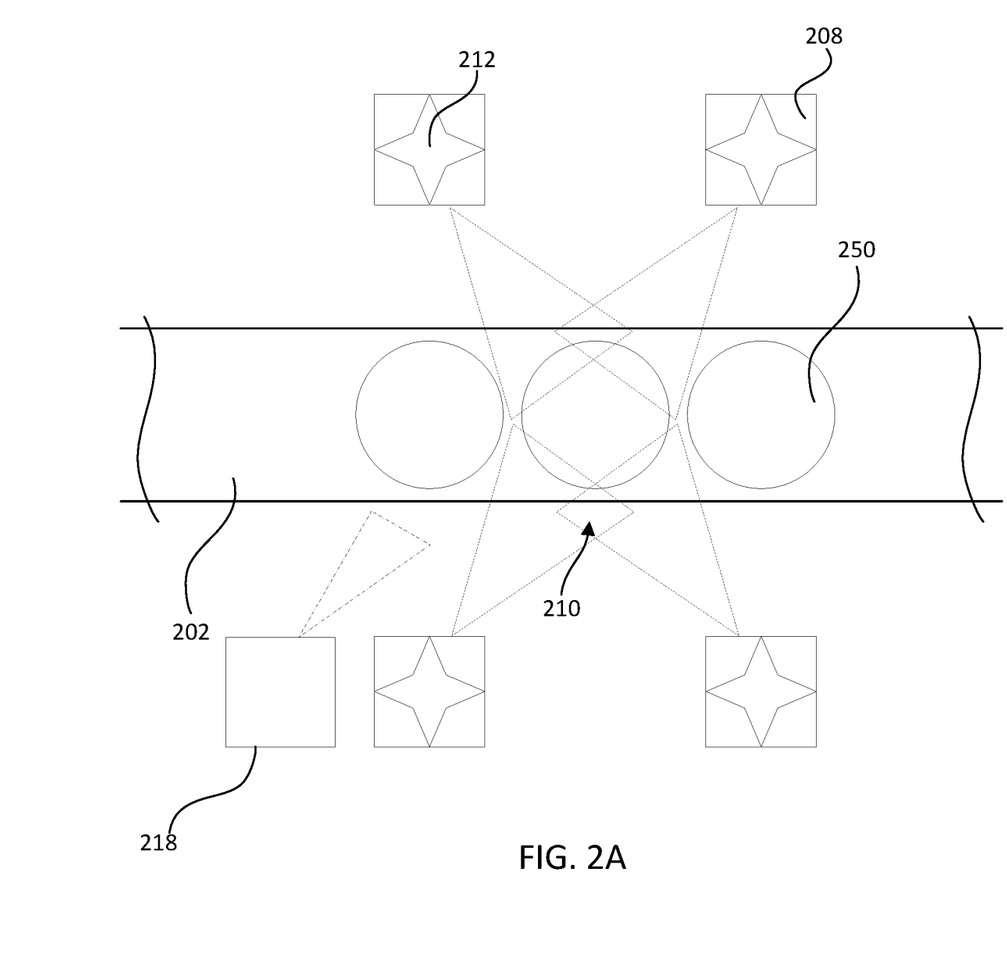
FIG. 2A illustrates a schematic partial top plan view of the production line of FIG. 2.

Turning back to FIG. 2, as the barcodes may be at any position on the can 250 when reaching the imaging position 210, embodiments may utilize two or more imaging sensors 208 to monitor each single file line of cans 250 in production line 200 (with at least one imaging sensor 208 being positioned on either side of the single file line) to maximize the likelihood that at least a portion of the barcode of a given can 250 is visible to the imaging sensors 208. For example, each single file line may include at least or about two imaging sensors, at least or about three imaging sensors, at least or about four imaging sensors, at least or about five imaging sensors, at least or about six imaging sensors, at least or about seven imaging sensors, at least or about eight imaging sensors, at least or about nine imaging sensors, at least or about ten imaging sensors, or more. Regardless of the number of imaging sensors 208 used, the imaging sensors 208 directed at a given single file line may be arranged to collectively image at least 75%, at least 85%, at least 95%, or approximately all of a visible surface area of the outer surface of an individual can 250 in the imaging position 210. For example, as shown in FIG. 2A, four imaging sensors 208 may be arranged about the imaging position 210, with one of the imaging sensors 208 being positioned to generate an image field that provides substantial 360 degrees (e.g., within about 20 degrees) of coverage about the outer periphery of the can 250. Such an arrangement of imaging sensors 208 may maximize the ability of the imaging sensors 208 to detect and analyze a barcode provided on a side of the can 250. In a particular embodiment, each of the imaging sensors 208 may be positioned in a different quadrant about the imaging position 208 and/or can 250, which may ensure that a clear, undistorted view of the barcode is visible within an image captured by at least one of the imaging sensors 208 unless the barcode is entirely obscured by an adjacent can 250.

Figure 2B:
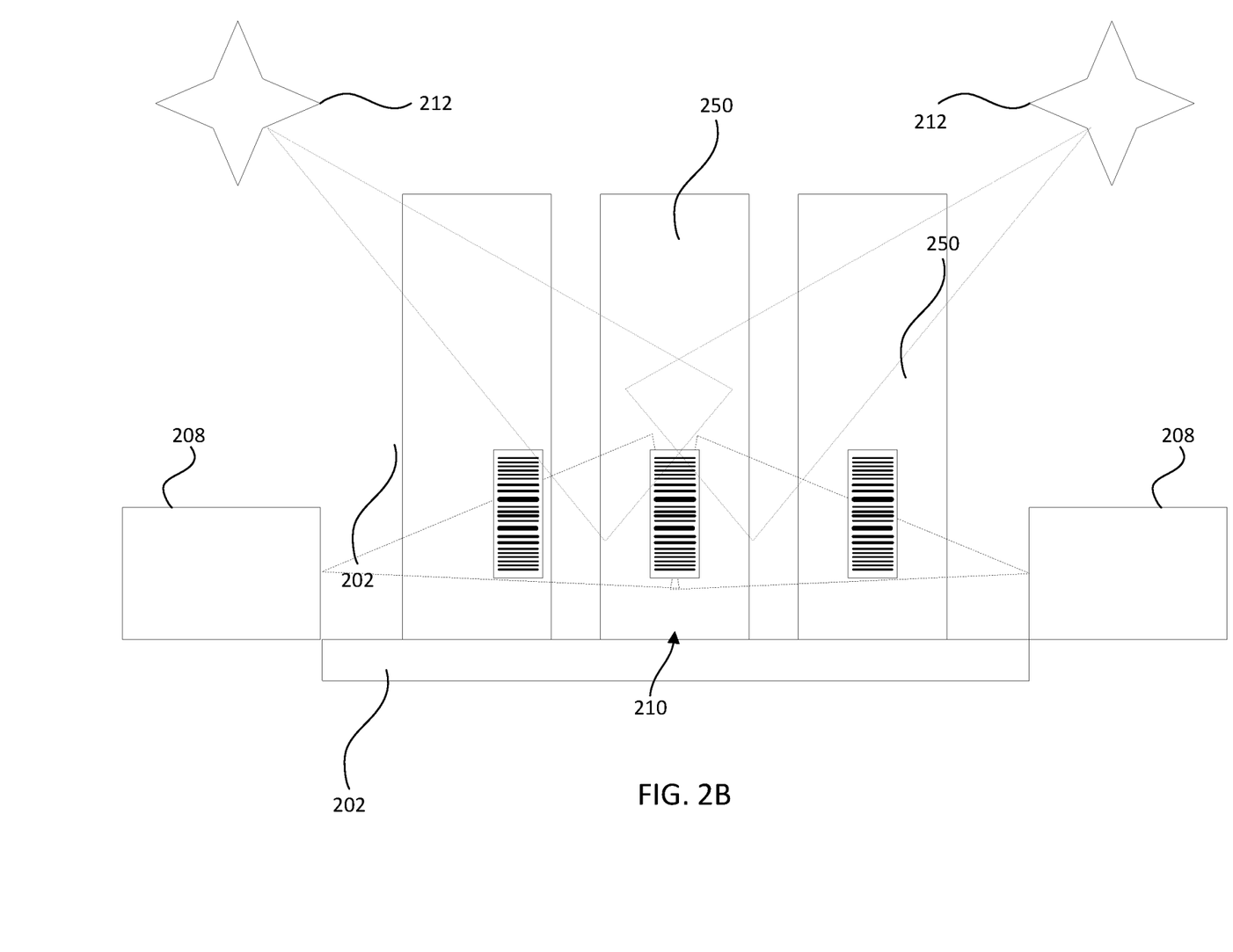
FIG. 2B illustrates schematic partial side elevation view of the production line of FIG. 2.

Production line 200 may include a number of lighting sources 212 that emit light that is directed toward imaging fields of the imaging sensors 208. For example, light emitted from each lighting source 212 may be directed toward the imaging position 210 on the conveyor mechanism 202 to help illuminate the outer surface of cans 250 as the cans 250 reach the imaging position 210. The light sources 212 may be light emitting diodes (LEDs), although other types of light sources are possible in various embodiments. In some embodiments, the light sources 212 may be affixed to and/or formed as part of the imaging sensors 208. For example, each imaging sensor 208 may include one or more LEDs or other light sources positioned on a housing of the imaging sensor 208. In a particular embodiment, each imaging sensor 208 may be a camera, with one or more LEDs arranged in a linear and/or arcuate manner about at least a portion of the camera lens. For example, a number of LEDs may be arranged to form an annular pattern that encircles the camera lens. In other embodiments, such as illustrated in FIG. 2B, light sources 212 may be discrete components that may be positioned above, below, and/or alongside the imaging sensors 208. As illustrated, the light sources 212 are positioned above the imaging sensors 208 and a position of the barcode of each can 250, with light from the light sources 212 being directed at a downward angle to illuminate the barcode of the can 250. In some embodiments, only one light source 212 may be provided on a given side of a single file line of cans 250. In other embodiments, multiple light sources 212 may be provided on each side of the single file line of cans 250. For example, each imaging sensor 208 may include a dedicated light source 212, such that a number of light sources 212 matches a number of imaging sensors 208. Other embodiments may utilize a greater number of light sources 212 than imaging sensors 208.

Images from the imaging sensors 208 may be analyzed to identify the presence barcodes. When a barcode is detected within a given image, the imaging sensors 208 and/or another computing device may analyze the barcode to decode information from the barcode. In some embodiments, only a portion of a barcode may need to be visible within an image to enable the barcode data to be decoded. For example, when the barcode is printed or otherwise provided in a vertical orientation on the can 250, only a portion of a width of the barcode need to be detected within any of the images to provide the imaging sensors 208 and/or computing device with a full length and set of lines of the barcode. This barcode orientation may enable a partial barcode, such as barcodes 252*b* and 252*c* shown in FIG. 3, to be decoded. In some embodiments, the imaging sensors 208 may be optical sensors, such as laser barcode scanners. In such embodiments, rather than imaging the cans 250, the barcode scanners may use a laser or other optical sensor to directly analyze and decode and read information from the barcodes.

The decoded barcode information may then be compared to predetermined barcode data. For example, a given batch of cans 250 may be associated with a given identifier that is formed from an alphanumeric character string. This character string may be unique to a given type of can 250 (such as for a specific beverage product). When a barcode is read from a can 250 on the production line 200, the barcode data may be compared against a known identifier of the correct can type. If the barcode data from the can 250 matches the predetermined barcode data, the can 250 may continue down the conveyor mechanism 202 to the subsequent station 206. If no barcode is read on a given can 250 (such as when the barcode is obscured by an adjacent can 250, not present, or otherwise unreadable; referred to herein as "unidentified cans") and/or the barcode data does not match the predetermined barcode data (i.e., a foreign can), the unidentified and/or foreign can 255 may be rejected. For example, a signal may be sent from the imaging sensors 208 and/or other computing device that triggers actuation of a removal mechanism 214 shown in FIG. 2. Removal mechanism 214 may be positioned downstream of the imaging sensors and may physically remove the unidentified and/or foreign can 255 from the production line 200 and prevent the unidentified and/or foreign can from reaching subsequent station 206. Removal mechanism 214 may be any device that is capable of removing one or more cans 250 from the production line 200, such as by diverting the cans 250 from a primary path of the conveyor mechanism 202. As just one example, the removal mechanism 214 may include a pneumatic blower that is configured to emit pressurized air to remove objects from the production line 200. For example, the pressurized air may push and/or otherwise divert unidentified and/or foreign cans 255 off of the production line 200. Other removal mechanisms such as mechanical arms may be utilized in various embodiments. In some embodiments, once an unidentified and/or foreign can 255 has been detected, the signal may cause the removal mechanism 214 to remove all cans 250 for a predetermined duration until the unidentified and/or foreign can 255 has been diverted and/or otherwise removed from the production line 200. The predetermined duration may be selected based on a distance from the imaging position 210 to the removal mechanism 214 and a rate of speed of the conveyor mechanism 202. The duration may be sufficiently long to ensure that the unidentified and/or foreign can 255 has been diverted and/or otherwise removed from the production line 200. In other embodiments, the removal mechanism 214 may be designed to remove only those cans 250 that have been detected as being unidentified and/or foreign cans 255. In such embodiments, the imaging sensors 208 and/or computing device may determine an amount of time it will take any unidentified and/or foreign cans 255 to be transported from the imaging position 210 to the removal mechanism 214. This amount of time may be based on a distance from the imaging position 210 to the removal mechanism 214 and a rate of speed of the conveyor mechanism 202. The signal sent from the imaging sensors 208 and/or computing device to the removal mechanism 214 may cause actuation of the removal mechanism 214 (such as expelling a short, controlled jet of air) after the amount of time has elapsed. In some embodiments, rather than using a time-based element to trigger the removal mechanism 214, one or more position and/or tracking sensors may be included that may monitor movement of any unidentified and/or foreign cans 255 and trigger actuation of the removal mechanism 214 when the unidentified and/or foreign can 255 has reached the removal mechanism 214.

In some embodiments, rather than using a fully-automated removal system, the removal mechanism 214 may include one or more audio and/or visual alert mechanisms (e.g., speakers, display screens, light sources, etc.) that may produce an alert every time an unidentified and/or foreign can 255 is detected. The alert may inform a human operator of the presence of the unidentified and/or foreign can 255 and may enable the human operator to manually remove the unidentified and/or foreign can 255. Such removal mechanisms 214 may be particularly useful in slow-speed production lines.

In some embodiments, when a foreign can 255 is detected, a signal may be communicated by the imaging sensors 208 and/or computing device that causes the production line 200 to halt. For example, the signal may cause each machine or device on the production line 200 to cease operation. An alarm may be sounded that may alert a human inspector to review the foreign can 255. By sounding the alarm and halting the production line 200, the human inspector may be provided with an opportunity to investigate how the foreign can 255 made it into the production line 200. The production line 200 may be restarted by the human.

In some embodiments, the production line 200 may include multiple sets of imaging sensors 208, with each set of imaging sensors 208 directed at a different imaging position 210. For example, two sets of four imaging sensors 208 may be positioned along the conveyor mechanism 202 (and/or on each single file line of cans 250). The imaging positions 210 of each set of imaging sensors 208 may be spaced apart from one another along the conveyor mechanism 202. The spacing between the imaging positions 210 may be determined based on an average rotation speed of the cans 250 as the cans 250 proceed down the production line 200. For example, the spacing may be selected such that if a can has an barcode at the first of the imaging positions the rotation of the can 250 will position the barcode within an area visible to the imaging sensors 208 at the second imaging position 210. Each of the cans 250 may then be read by both sets of imaging sensors 208. Data from each of the two sets of imaging sensors 208 may be combined and compared by the imaging sensors 208 and/or other computing device to generate approval/rejection determinations. For example, if one or both sets of imaging sensors 208 detect a proper barcode, the can 250 may be approved and proceed to the subsequent station 206. If neither set of imaging sensors 208 detects a barcode (which should be uncommon due to the placement of the imaging positions 210), the can 250 may be rejected as unidentified. If one or both of the sets of imaging sensors 208 detects an improper barcode, the foreign can 255 may be rejected and/or the production line 200 may be halted.

In other embodiments, production line 200 may include a return line. If a barcode is not identified on a given can 250 by the imaging sensors 208. The removal mechanism 214 and/or other device may redirect the unidentified can to the return line. The return line may transport the unidentified can upstream to a position on the conveyor mechanism 202 that precedes the imaging sensors 208. The unidentified can 250 may then be imaged again by the imaging sensors 208 in an attempt to capture the barcode. This process may be repeated as many times as is necessary to detect a barcode. Once the barcode is detected, the can may be approved or rejected as described above.

One or more waste collection mechanisms 216 may be provided to collect any diverted unidentified and/or foreign cans 255 for subsequent transport to a recycling center. In some embodiments, the waste collection mechanism may include a bin or chute that collects unacceptable cans. In other embodiments, the waste collection mechanism 216 may be a waste conveyor that transports the collected cans to a bin or other storage area for subsequent transport to the recycling center.

In instances in which the barcode is a QR code or other two-dimensional barcode and is not fully captured within any single image of the imaging sensors 208, the imaging sensors 208 and/or a computing device coupled with the imaging sensors 208 may determine whether portions of the QR code are visible in multiple images. If the QR code is visible in multiple images, the relevant images may be digitally stitched together to form a composite image showing the full QR code. For example, the imaging sensors 208 and/or computing device may analyze the images to identify regions of overlap within two or more images and combine the images together to generate the composite image. The full QR code within the composite image may be decoded and analyzed to determine if the data encoded in the QR code matches predetermined barcode data as described above.

In some embodiments, rather than (or in addition to) barcodes, the cans 250 or other objects may include radio frequency identification (RFID) tags, such as passive RFID tags like near field communication (NFC) chips and/or other passive RFID chips. In such embodiments, the production line 200 may include a number of RFID readers that may read data from each RFID tag as the cans 250 pass the RFID readers. For example, with passive RFID tags, the RFID reader may emit an RF signal that powers the RFID tag, which may then send back a signal with an identifier that provides data that may be analyzed to determine an identity of the can 250.

The barcode and/or RFID verification techniques described herein may be used in place of conventional mixed label inspection techniques. In other embodiments, the barcode and/or RFID verification techniques described herein may be used to supplement the results of a conventional mixed label inspection system. For example, one or more imaging devices of a mixed label inspection system may be positioned before and/or after the imaging (or RFID) sensors used for data verification as described herein. The mixed label inspection system and the imaging sensors of the present invention may be positioned at a same location in a production line (e.g., at or between a single station or pair of stations) and/or may be provided at different locations on the production line (e.g., the mixed image inspection system positioned after the decorator and the barcode/RFID system just before the palletizer and/or filling station).

Production line 200 may include one or more proximity sensors 218. For example, at least one proximity sensor 218 may be directed at each single file line of the conveyor mechanism. The proximity sensors 218 may include laser sensors, infrared (IR) sensors, millimeter wave sensors, capacitive sensors, Doppler sensors, RADAR sensors, photocell sensors, inductive sensors, and the like. The proximity sensors 218 may be used to detect when a particular can 250 (or other object) is approaching the imaging position on the conveyor mechanism 202. When a can 250 is detected, a signal may be transmitted to the imaging sensors 208 that triggers the imaging sensors (when not operating continuously and/or in video mode) directed at a given imaging position 210 to simultaneously capture an image of the outer surface of the can 250. Typically, the image captured by one or more of the imaging sensors 208 may include a barcode of the can 250, although in some instances the barcode may be entirely obscured by another can 250. Along with triggering the actuation of the imaging sensors 208, the proximity sensors 218 may be used to count the number of cans 250 that are passing over the conveyor mechanism 202. This count may be reconciled with a count of the number of barcodes analyzed to determine whether all cans 250 in a production run have been accounted for. For example, a number of cans 250 detected by the proximity sensor 218 may be compared with a number of barcodes analyzed by the imaging sensors 208 (which may include a number of correct barcodes and/or a number of foreign barcodes) to determine whether all of the plurality of objects within a production run have been verified. In some embodiments, a number of unidentified cans may also be factored into the comparison to ensure all cans 250 within the production run have been verified. A computing device of the production line 200 may track statistics associated with error rates (e.g., a number of unidentified and/or foreign cans 255 detected in each run, what went wrong, what was the cause of the error, etc.), which may be used to improve the operation of the production line 200.

By automating the can identification process using barcode verification techniques described here, embodiments of the present invention may reduce the error rate associated with current mixed label inspection techniques and/or human inspection. Additionally, by removing the human element entirely when no foreign cans 255 are detected, embodiments may significantly improve production line speed, which may help increase the efficiency of the production line.

Figure 4:
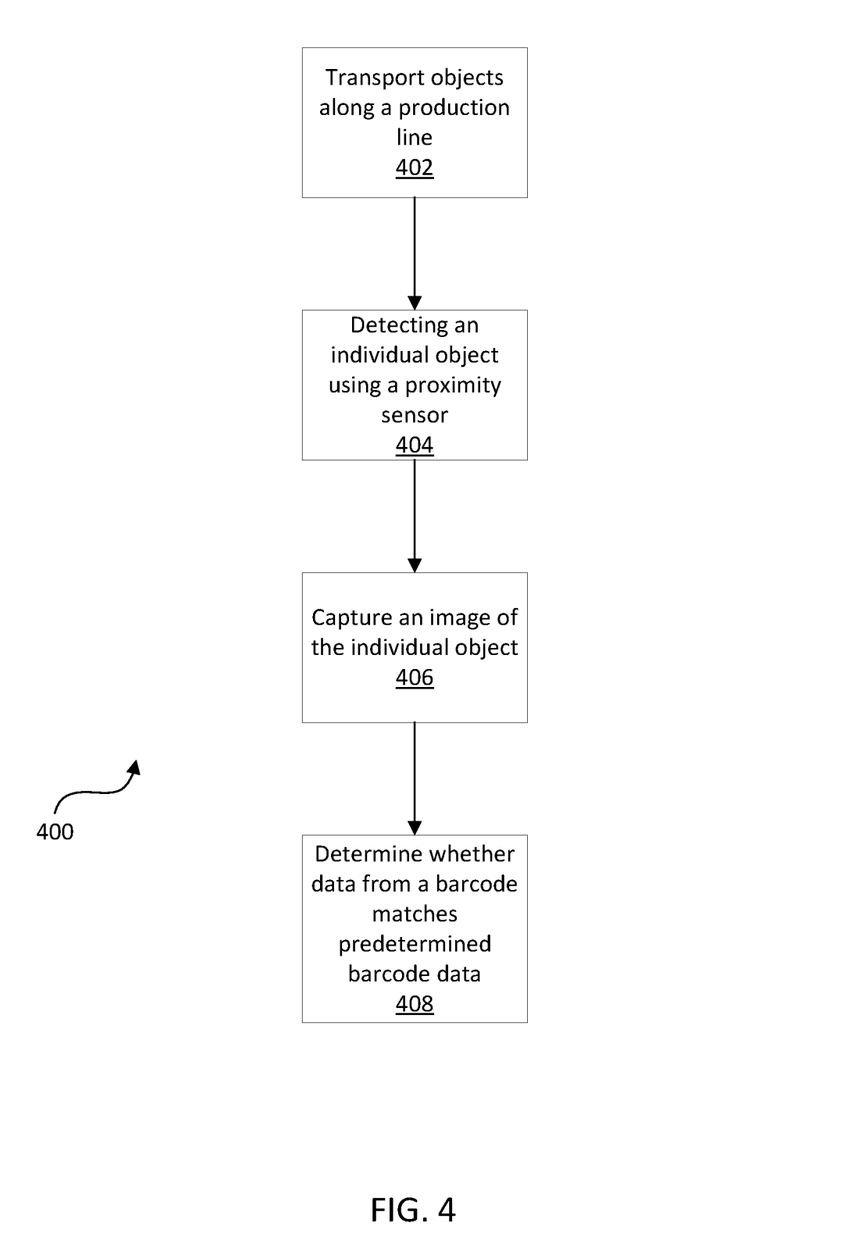
FIG. 4 is a flowchart illustrating a process for verifying an identity of objects in a production line according to embodiments of the present invention.

FIG. 4 is a flowchart illustrating a process 400 for verifying an identity of objects in a production line. Process 400 may be performed by various devices of a production line, similar to production lines 100 and 200 described herein. For example, various functions of process 400 may be performed using a computing device, imaging sensors, conveyor mechanisms, and/or removal mechanisms. Process 400 may incorporate any of the functionality of such production lines in various embodiments. Process 400 may include a number of optional operations, which may or may not be specifically associated with some embodiments of methods according to the present technology.

Process 400 may begin at operation 402 by transporting a plurality of objects, such as cans, along a production line. The objects may be transported using one or more conveyor mechanisms, such as vacuum conveyors, belt conveyors, chain conveyors, and the like. In some embodiments, the conveyor mechanisms may force the objects into one or more single file lines, such as by using a dual single filer conveyor mechanism. Process 400 may include detecting an individual object of the plurality of objects using a proximity sensor at operation 404. For example, as each object passes by the proximity sensor and approaches an imaging position of a number of imaging sensors, the object may be detected. Once an object is detected, at least some of the imaging sensors are triggered to capture an image of a barcode on an outer surface of the individual object at operation 406. Oftentimes, at least one image captured by one of the imaging sensors may include all or part of the barcode. The barcodes may be vertically oriented on the outer surface of the can in some embodiments, which may enable data from the barcode to be decoded and read even if only a vertical sliver of the barcode is detected in a given image. In some embodiments, the outer surface of the object may be illuminated by one or more light sources that emit light directed at the outer surface to enhance the visibility of the barcode.

Process 400 may include determining whether data from the barcode matches predetermined barcode data at operation 408. This determination may include decoding information from the detected full or partial barcode and comparing the decoded information with an identifier and/or other information of a known can type. For example, a production run may be initiated to package and/or fill a particular can (or other container) associated with a particular beverage or other product. The particular can may include a predetermined identifier that ensures the proper packaging is used with a particular product. This information may be initialized using one or more techniques. For example, the predetermined identifier may be set manually by a human operator keying in a barcode identifier to use as the predetermined identifier. In some embodiments, a human operator may use a hand scanner (or other scanning device) to scan the barcode from one correct can to set the predetermined identifier for a given production run. In some embodiments, the predetermined identifier may be selected by the human operator using an interface that accesses a database of known barcode information. For example, the operator may interact with a user interface that enables the operator to select a given can type for the production run, which may cause the barcode associated with the selected can type to be initialized as the predetermined identifier. Any combination of the above and/or other barcode initialization processes may be performed in various embodiments. Information from the barcode may be compared with this predetermined information to ensure that each can moving down the production line is a correct type of can prior to the can being palletized and/or filled. If an incorrect barcode is read (indicating a foreign can) and/or no barcode was detected, process 400 may include removing the individual object from the production line. For example, a removal mechanism may be triggered that diverts and/or otherwise removes the individual object from the production line for inspection and/or recycling. In some embodiments, when a foreign can is detected process 400 may include halting the production line and/or sounding an alarm. The halting of the production line may provide a human inspector an opportunity to review the foreign can and investigate how the foreign can made it into the production line. The production line may later be restarted by the human. In some embodiments, the process 400 may include comparing a number of objects detected by the proximity sensor with a number of barcodes analyzed by the imaging sensors (possibly including a number of objects with no detected barcode) to determine whether all of the plurality of objects within a production run have been verified.

Figure 5:
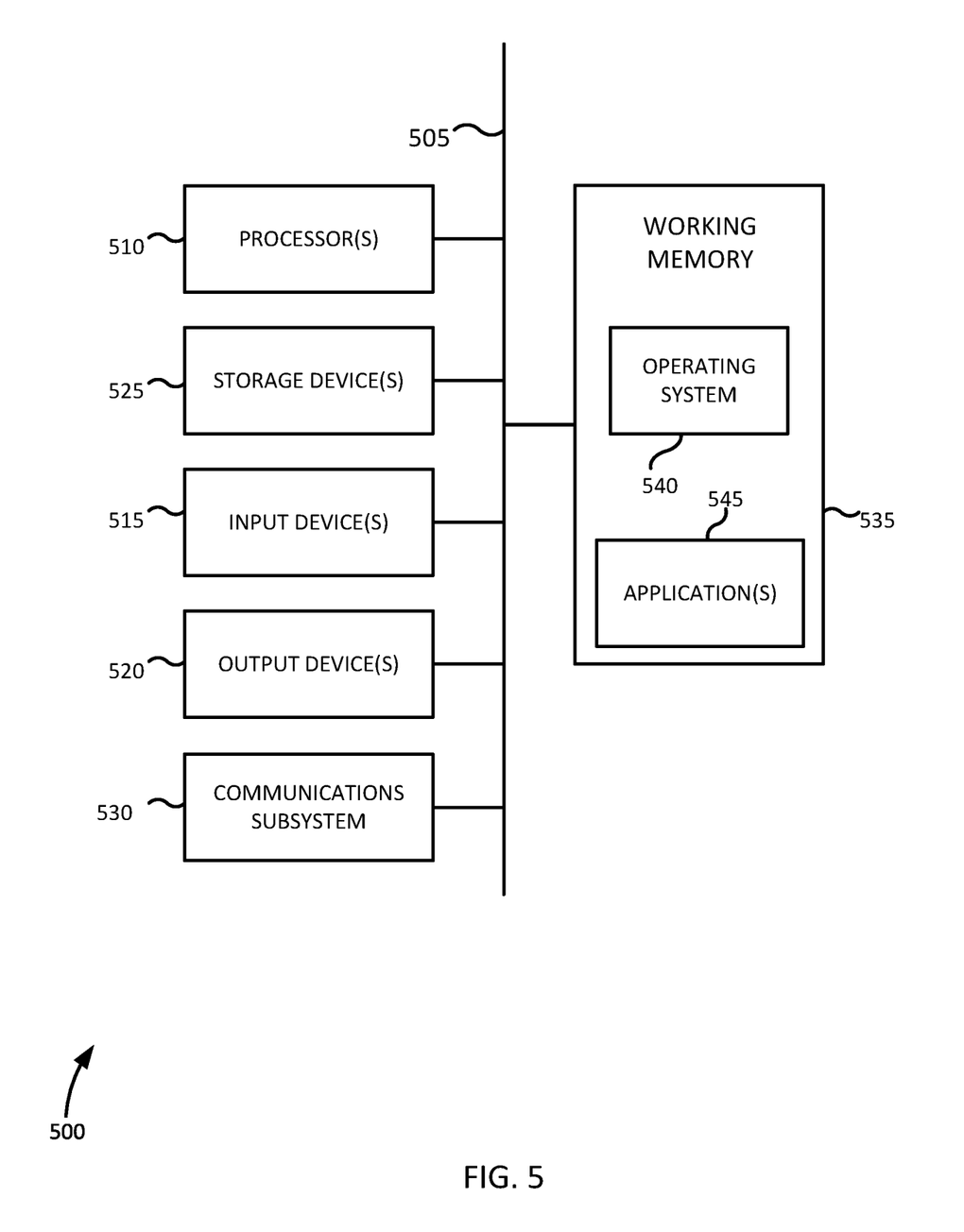
FIG. 5 is a block diagram of a computing system according to embodiments of the present invention.

A computer system as illustrated in FIG. 5 may be incorporated as part of the previously described computerized devices. For example, computer system 500 can represent some of the components of computing devices, such as conveyor mechanisms 202, imaging sensors 208, removal devices 214, and/or other computing devices described herein. FIG. 5 provides a schematic illustration of one embodiment of a computer system 500 that can perform the methods provided by various other embodiments, as described herein. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more processors, such as one or more central processing units (CPUs), graphical processing units (GPUs), special-purpose processors (such as digital signal processing chips, graphics acceleration processors, and/or the like); one or more input devices 515, which can include without limitation a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein. Each device described herein (imaging sensor, conveyor mechanism, removal mechanism, other computing device, etc.) may include and/or be coupled with a processing unit 510 that may perform and/or cause the performance of any of the functionality attributed to that device. For example, one or more processing units 510 may trigger the imaging sensors to capture an image of a barcode, decode and read the barcode is determine whether data from the barcode matches predetermined barcode data, send a signal that causes a removal device to remove an individual object from the production line, halt the production line, sound an alarm, and/or compare a number of objects detected by the proximity sensor with a number of barcodes analyzed by the imaging sensors. Additional functionality may be performed by one or more processing units 510 in various embodiments.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire, and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processing unit 510.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of verifying an identity of objects in a production line, comprising:
    transporting a plurality of objects along a production line;
    detecting an individual object of the plurality of objects using a proximity sensor;
    triggering a plurality of imaging sensors to capture an image of a barcode on an outer surface of the individual object based on detection of the individual object by the proximity sensor;
    determining whether data from the barcode matches predetermined barcode data; and
    comparing a count of a number of objects detected by the proximity sensor with a count of a number of barcodes analyzed by the plurality of imaging sensors to determine whether the plurality of objects within a production run have been verified.

2. The method of verifying an identity of objects in a production line of claim 1, further comprising:
    halting movement of at least a portion of the production line upon determining that the data from the barcode does not match the predetermined barcode data.

3. The method of verifying an identity of objects in a production line of claim 2, further comprising:
    removing the individual object from the production line upon determining that the data from the barcode does not match the predetermined barcode data.

4. The method of verifying an identity of objects in a production line of claim 3, wherein:
    removing the individual object from the production line comprises removing a number of the plurality of objects for a predetermined duration until the individual object has been removed.

5. The method of verifying an identity of objects in a production line of claim 4, wherein:
    the predetermined duration is based on one or both of a distance between an imaging position of the plurality of imaging sensors and a rate of speed of a transport mechanism of the production line.

6. The method of verifying an identity of objects in a production line of claim 3, wherein:
removing the individual object from the production line comprises:
determining an amount of time it will take for the individual object to be transported from an imaging position of the plurality of imaging sensors to a removal device; and
causing the removal device to actuate after the amount of time has elapsed to remove only the individual object.

7. The method of verifying an identity of objects in a production line of claim 1, wherein:
the barcode is aligned vertically along a side of the individual object.

8. The method of verifying an identity of objects in a production line of claim 1, further comprising:
removing the individual object from the production line if no barcode is imaged by the plurality of imaging sensors.

9. The method of verifying an identity of objects in a production line of claim 1, further comprising:
illuminating the outer surface of the object with a plurality of light sources that are directed toward the outer surface.

10. The method of verifying an identity of objects in a production line of claim 1, further comprising:
verifying that the individual object is a proper object for the production run based only on the determining whether the data from the barcode matches predetermined barcode data.

11. The method of verifying an identity of objects in a production line of claim 1, wherein:
each of the plurality of imaging sensors comprises a dedicated light source that directs light to an imaging position of a respective one of the plurality of imaging sensors.

12. The method of verifying an identity of objects in a production line of claim 11, wherein:
each dedicated light source is affixed to the respective one of the plurality of imagining sensors.

13. The method of verifying an identity of objects in a production line of claim 12, wherein:
each dedicated light source comprises a plurality of light emitting diodes (LEDs) arranged in an annular pattern that encircles a lens of the respective one of the plurality of imaging sensors.

14. The method of verifying an identity of objects in a production line of claim 1, wherein:
the count of the number of barcodes analyzed by the plurality of imaging sensors comprises all barcodes of the plurality of objects that matched the predetermined barcode data, all barcodes of the plurality of objects that did not match the predetermined barcode data, and a number of objects whose barcodes were not identified.

15. A production line, comprising:
a conveyor mechanism that is configured to transport a plurality of objects down a portion of the production line;
a proximity sensor disposed along the conveyor mechanism;
a plurality of imaging sensors directed at the conveyor mechanism;
one or more processors; and
a memory having instructions stored thereon that, when executed, cause the one or more processors to:
detect an individual object of the plurality of objects using the proximity sensor;
trigger the plurality of imaging sensors to capture an image of a barcode on an outer surface of the individual object based on detection of the individual object by the proximity sensor;
determine whether data from the barcode matches predetermined barcode data; and
compare a count of a number of objects detected by the proximity sensor with a count of a number of barcodes analyzed by the plurality of imaging sensors to determine whether the plurality of objects within a production run have been verified.

16. The production line of claim 15, further comprising:
a removal mechanism positioned downstream of the plurality of imaging sensors, wherein the instructions further cause the one or more processors to cause the removal mechanism to remove the individual object from the production line upon determining that the data from the barcode does not match the predetermined barcode data.

17. The production line of claim 16, wherein:
the removal mechanism comprises a pneumatic blower that is configured to emit pressurized air to remove objects from the production line.

18. The production line of claim 15, further comprising:
a plurality of light sources that emit light that is directed toward imaging fields of the plurality of imaging sensors.

19. The production line of claim 18, wherein:
each of the plurality of light sources is positioned above or below a height of the individual object.

20. The production line of claim 15, wherein:
the plurality of imaging sensors are arranged to generate an overall image field that extends 360 degrees about the individual object.

21. The production line of claim 15, wherein:
the plurality of imaging sensors comprise four imaging sensors, with one of the four imaging sensors disposed within a different quadrant about the individual object.

22. A production line, comprising:
a conveyor mechanism that is configured to transport a plurality of objects down a portion of the production line;
a proximity sensor disposed along the conveyor mechanism;
a plurality of optical sensors directed at the conveyor mechanism;
one or more processors; and
a memory having instructions stored thereon that, when executed, cause the one or more processors to:
detect an individual object of the plurality of objects using the proximity sensor;
analyze a barcode detected on an outer surface of the individual object using the plurality of optical sensors based on detection of the individual object by the proximity sensor;
determine whether data from the barcode matches predetermined barcode data; and
compare a count of a number of objects detected by the proximity sensor with a count of a number of barcodes analyzed by the plurality of imaging sensors to determine whether the plurality of objects within a production run have been verified.

23. The production line of claim 22, wherein:
each of the plurality of optical sensors comprises a camera that is configured to image the outer surface of the individual object; and
analyzing the barcode comprises detecting the barcode within an image of the outer surface of the individual object.

24. The production line of claim 22, wherein:
each of the plurality of optical sensors comprises a laser scanner.

25. The production line of claim 22, further comprising:
a plurality of light sources directed toward image fields of the plurality of optical sensors, wherein a number of the plurality of light sources is equal to or greater than a number of the plurality of optical sensors.

26. The production line of claim 22, wherein the instructions further cause the one or more processors to:
halt movement of at least a portion of the production line upon determining that the data from the barcode does not match the predetermined barcode data.

27. The production line of claim 22, wherein the instructions further cause the one or more processors to:
compare a number of objects detected by the proximity sensor with a number of barcodes analyzed by the plurality of imaging sensors to determine whether all of the plurality of objects within a production run have been verified.

28. The production line of claim 22, further comprising:
a necker that is configured to shape a neck of each of the plurality of objects, wherein the conveyor mechanism is configured to transport the plurality of objects from the necker at least partially to a subsequent station of the production line.

29. The production line of claim 28, wherein:
the subsequent station comprises a palletizer.

30. The production line of claim 22, further comprising:
an unloading mechanism that is configured to transfer the plurality of objects from a pallet to the conveyor mechanism.

31. The production line of claim 30, further comprising:
a filling station that is configured to receive acceptable objects of the plurality of objects from the conveyor mechanism.

* * * * *